US005094552A

United States Patent [19]

Monroe et al.

[11] Patent Number: 5,094,552

[45] Date of Patent: Mar. 10, 1992

[54] INTERLOCKING STRAIN RELIEF

[75] Inventors: Kevin T. Monroe, Harrisburg; Robert N. Weber, Hummelstown, both of Pa.

[73] Assignee: AMP Incorporated, Harrisburg, Pa.

[21] Appl. No.: 614,533

[22] Filed: Nov. 16, 1990

[51] Int. Cl.[5] ........................... G02B 6/00; G02B 6/36

[52] U.S. Cl. ...................................................... 385/76

[58] Field of Search ................ 350/96.10, 96.20–96.22

[56] References Cited

U.S. PATENT DOCUMENTS 4,167,303 9/1979 Bowen et al. .................... 350/96.21

4,203,004 5/1980 Cox .................................... 174/135

FOREIGN PATENT DOCUMENTS 0260774 6/1979 European Pat. Off. .

*Primary Examiner*—Akm Ullah

[57] ABSTRACT

A strain relief (9) for right angle coupling of a fiber optic cable (2) with a connector (1) comprises, a generally tubular length of flexible material provided with a cylindrical axial bore (18) sized for receiving the fiber optic cable (2), and formed with narrow openings (24), an imposing tongue (27) in each of the openings (24) and a complementary groove (29) across the opening (26), whereby upon bending of the tubular length, tongues (27) lodge in the grooves (29).

13 Claims, 5 Drawing Sheets 2
6
5
5
4
3
17
16
24
27
27
29
24
29
24
9
8
18
15
7
11
12
13
10
14
1

19
20
21
22
23
24
25

9
15
16
17
26
27
28
29
30

9
15
16
17
18
26
27
28
29
30
31
32
33
34

17
26
29
30
27
28
28
28
16
29
30
27
28
28
26
26
30
28
29
27
28
26
30
28
29
27
28
26
6
9
6
15
18

INTERLOCKING STRAIN RELIEF

FIELD OF THE INVENTION

The present invention relates to a strain relief provided in a right angle configuration for an optical fiber connector.

BACKGROUND OF THE INVENTION

The present invention relates to an improvement to connectors for joining light transmitting fiber cables to transmitter and receiver devices, and to other cables. In such connectors, it is important to project the fiber cable away from the connector in a manner that will not overstress, severely bend or kink the buffered fiber. Overstressing, severe bending or kinking may interfere with the signal transmitting characteristics of the fiber. However, it is not always possible to project the cable in a straight line from the connector, especially when routing the cable in tight quarters. For example, oftentimes connection must be made to a transceiver located to the rear of a computer and toward a wall, thereby requiring routing of the cable at an angle, indeed, at times a severe angle to the plane of the connection.

The present invention permits dressing cables from fiber optic connections at angles to the plane of the connection but without overstressing or kinking the buffered fiber to provide an improved strain relief and to maintain the travel of the cable from the connection area within required minimum bend radius parameters.

The present invention has applicability to a wide range of connectors, including connector assemblies for fixed shroud duplex systems, single mode and multimode bayonet type connectors and the like.

SUMMARY OF THE INVENTION

The present invention relates to an interlocking strain relief for a connector for joining one or more light transmitting fiber cables to transmitter and receiver devices, and to other cables. By the invention, an improved strain relief boot permits angle dressing of a fiber cable of the connector from the point of connection. Angle dressing refers to the cable and strain relief boot being curved along a line that itself is curved along a tolerated or allowed radius of curvature that extends the line at an angle from the point of connection of the fiber cable. The improved interlocking strain relief for right angle coupling comprises a generally tubular length of flexible material provided with a bore receiving the fiber optic cable. The tubular length is profiled at a first end to be anchored to the connector while clamping onto the fiber optic cable. The tubular length is formed with a series of narrow openings extending normally, transverse, with respect to the axis of the bore. The tubular length has a corresponding tongue imposing into corresponding each of the openings, and has a corresponding, complementary groove across the corresponding opening opposing the corresponding tongue, whereby upon bending of the tubular length into an arc or curve, the corresponding tongue lodges in the corresponding groove to maintain the tubular length in a self supporting, curved relationship.

The strain relief includes tongues, each of which is sharply contoured to provide an enlargement with prominent shoulders and which imposes into each respective opening with each complementary groove located across the opening in opposed relationship to each tongue. Further, each groove has a reduced neck entry which is formed of a shape so as to provide for close fit interlocking with each respective complementary tongue. The strain relief may be characterized by at least four of each such tongues and four of each such opposing grooves located at ninety degree intervals around the strain relief. The strain relief may be curved at a ninety degree angle and with each tongue within the resulting constricted arc of the length being interlocked into complementary grooves to maintain the strain relief at the desired ninety degree orientation.

The present invention is an improvement to optical connectors such as those disclosed by U.S. Pat. No. 4,834,487, for example, comprising an alignment ferrule having a central passage for aligning an optical fiber. The ferrule has a radially enlarged collar and a circumferential groove spaced from a rear transverse face of the collar. The ferrule has a rear-facing annular shoulder formed by a terminal portion of reduced outer diameter. The connector further comprises a snap ring mounted in the groove, a coupling nut moveable axially over the ferrule and having a transverse inner flange encircling the alignment ferrule forwardly of the snap ring, and a spring for compression directly in engagement against the rear transverse face of the collar and for compression against the inner flange. There is a clearance between the coupling nut and the collar in which the collar is moveable during retraction of the collar into the coupling nut to compress the spring.

The present invention also relates to SMA type connectors improved by means of the right angle strain relief boot where the connector is described as comprising a conical profiled ferrule having central passageway for receiving and aligning a fiber optic cable, a tubular contact body encompassing the ferrule, and a coupling nut having a central bore for receiving the contact body and the conical profiled ferrule therein by press fit. The ferrule has a rear circumferential groove and flange.

Further, the present invention may be described as an improvement to a connector such as that taught by Ser. No. 450,330, filed Dec. 13, 1989, where the connector assembly comprises a shell encircling a spring biased holder for an optical fiber, a sheath to prevent leaking of adhesive from the holder, and wherein the strength members of the optical fiber cable are anchored to the shell. The holder and the optical fiber of the cable are displaceable with respect to the strength members of the cable.

The right angle strain relief of the present invention also has applicability to connectors of the type taught by Bowen, et al, U.S. Pat. No. 4,167,303, wherein the connector assembly includes a housing with at least one cable receiving bore therein; an assembly including an annular crimping ring, a profiled ferrule member, and a helical spring member secured to an end of each cable; and a cap member securing the ferrule members in the housing member in a spring loaded condition.

Further, the present invention is applicable as part of a connector including a connector assembly such as that disclosed by Glover, et al, U.S. Pat. No. 4,611,887, in which the connector assembly comprises a housing member having a passageway extending therethrough. Further included is a receptacle connector member latchably mounted to the passageway and having therein fiber optic connectors terminated to ends of fiber optic transmission members and to said portion of optical fiber cable. The fiber optic connectors are mounted in the receptacle connector member as spring biased connectors with profiled resilient front ends of the connectors disposed in profiled bores of alignment ferrules that are floatably mounted in the receptacle connector member. Further included is a plug connector member having mounted therein spring biased fiber optic connectors terminated to ends of fiber optic transmission members. Latch members on the plug connector member latchably secure the plug connector member in the housing member with profiled resilient front ends of the fiber optic connectors being disposed in the profiled bores of the alignment ferrules thereby connecting the respective fiber optic transmission members together under spring force.

DESCRIPTION OF A PREFERRED EMBODIMENT

Figure 1:
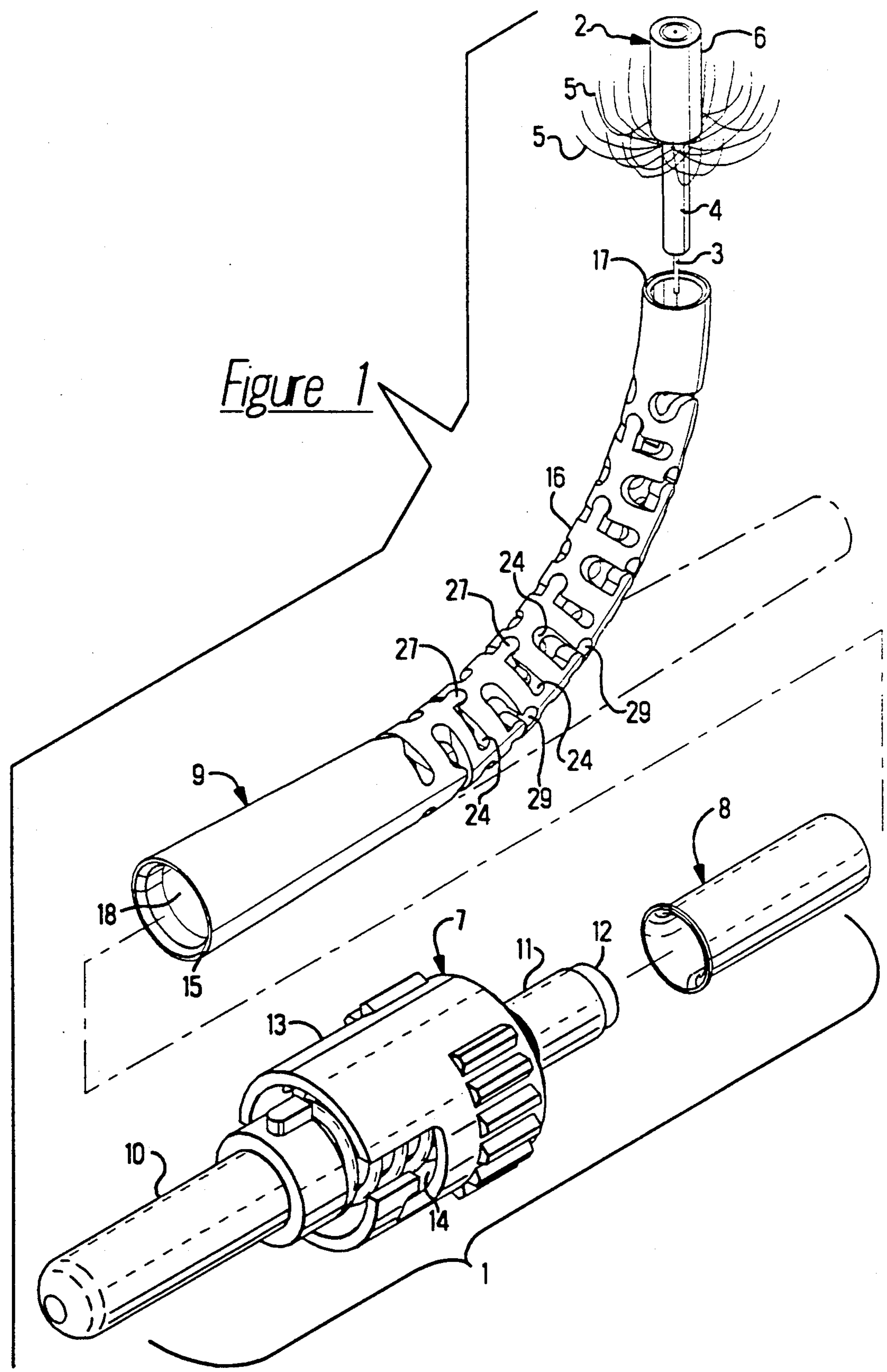
FIG. 1 is a fragmentary perspective view of a bayonet type connector together with an optical fiber cable, a crimp ferrule and an interlocking strain relief of the present invention configured at a right angle to the plane of connection between the boot and the connector.
Figure 2:
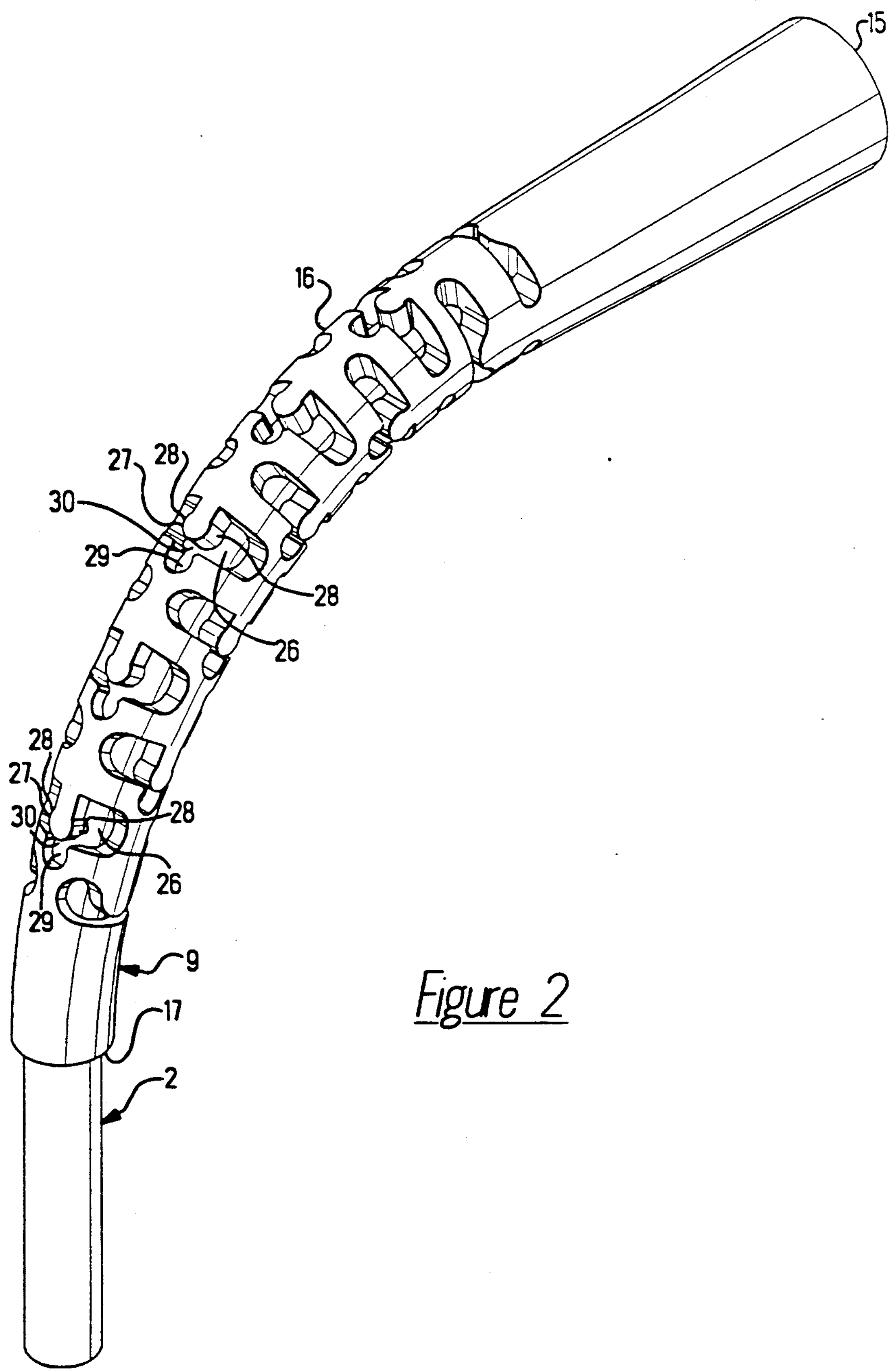
FIG. 2 is a perspective view of assembled optical fiber cable and interlocking strain relief.

Referring to FIGS. 1 and 2, shown, by way of example, is a connector 1 for an optical fiber cable 2. As shown in FIG. 1, the cable 2 includes an elongated central optical fiber 3 concentrically encircled by a buffer 4 together comprising a buffer covered fiber 3, 4. The cable 2 includes a load bearing portion in the form of elongated strength members 5 that extend axially along the cable 2. The strength members 5 are distributed over the outer diameter of the buffer covered fiber 3,4. The cable 2 further includes an outer jacket 6 of polymeric material enclosing the strength members 5. Parts of the cable 2 are cut away as shown to provide a length of fiber 3 projecting from the buffer 4, and a length of the buffer covered fiber 3, 4 projecting from the strength members 5, and lengths of the strength members 5 projecting from the jacket 6.

The connector 1 includes an optical connector assembly 7 and a crimp ferrule 8. An interlocking strain relief boot 9 is also shown. The connector assembly 7 includes a rigid alignment ferrule 11 enclosed by a protective dust cover 10. The alignment ferrule 11 has an axial central passage (not shown) for aligning the optical fiber 3 of the cable 2. The passage emerges from the rear end 12 of the alignment ferrule 11 for accepting the optical fiber cable 2.

A coupling nut 13 encompasses the alignment ferrule 11 of the connector 1, and has J-shaped bayonet type slot 14 for connection with a known complementary connector bushing (not shown). The front end of the alignment ferrule 11, shown protected by the dust cover 10, is rigid and is constructed to enter an alignment sleeve, not shown, within the complementary connector bushing.

The interlocking strain relief boot 9 is shown configured into a right angle alignment with the plane of connection between the boot 9 and the optical connector assembly 7. The boot 9 provides heavy duty, crush and abrasion protection to fiber optic cable 2 while permitting bending of the cable to a tolerated, or allowed, minimum radii. The strain relief boot 9 has a short generally cylindrical end portion 15 and a generally cylindrical main body 16 which ultimately tapers towards the other end 17. A cylindrical bore 18 is axially aligned through the boot 9 and is sized to comfortably accommodate the exterior diameter of a fiber optic cable 2.

Figure 3:
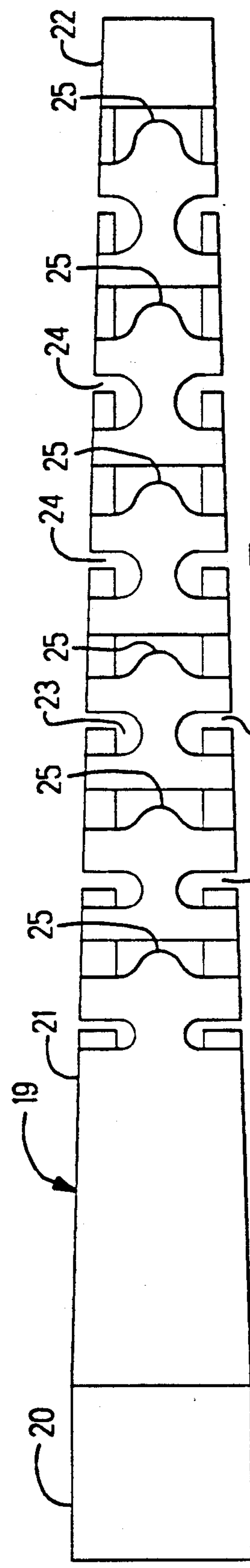
FIG. 3 is a front elevation view of a strain relief of the prior art.
Figure 4:
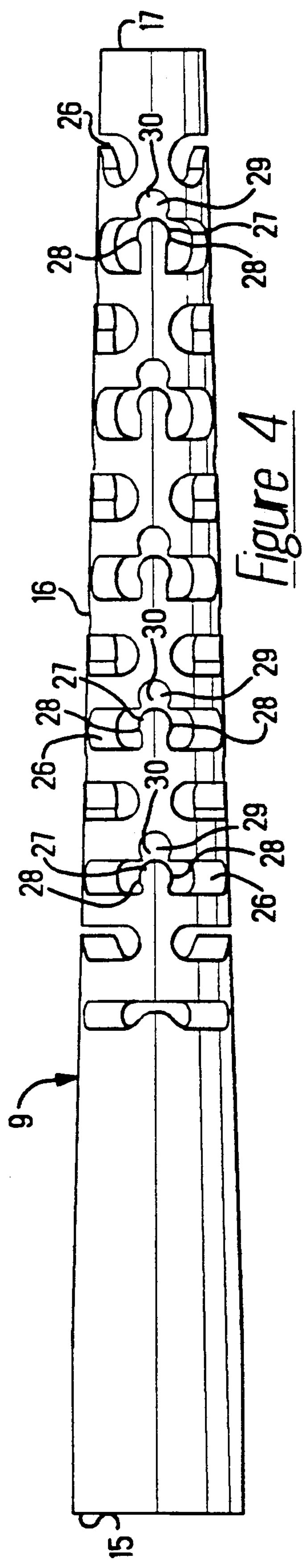
FIG. 4 is a front elevation view of a strain relief of the present invention.

In FIG. 3 is shown a strain relief 19 described further in European Patent Application 87201898. FIG. 3 is a front elevation showing a short generally right-cylindrical end portion 20 followed by a generally cylindrical portion 21 which ultimately tapers towards the other end 22. A cylindrical bore 23 axially aligned through the strain relief 19 is sized to accommodate the exterior diameter of a fiber optic cable. Shown is an overlapping, alternately positioned, staggered series of cut openings 24 provided in the tapered portion 21 of strain relief 19 to provide flexibility. Each cut opening 24 is provided with a generally semi-circular, mid position internal side extension 25 of predetermined size on one long side of each of the openings 24 which ensures that the tapered portion 21 and individual optical fibers of a cable contained therewithin will not be bent to too small a radius.

In contrast, shown in FIGS. 1, 2, 4, 5 and 6, is the interlocking strain relief 9 of the present invention. The relief 9 is a hard thermoplastic material for example, an ethylene propylene copolymer. Normally, this material resists bending. Bending of the strain relief 9 is required, however. Shown is the short, generally cylindrical end portion 15 and generally cylindrical main body 16 ultimately tapering, in outer diameter, toward the other end 17. A stepped cylindrical bore 18 is axially aligned through the boot 9 and is sized to comfortably accommodate the exterior diameter of the fiber optic cable 2. The relief 9 is characterized by multiple series of openings 26 provided lengthwise in the tapered portion 16. Each opening 26 is a narrow, elongated opening extending transversely to, and aligned normally with, the longitudinal axis of the bore of the strain relief 9. Each opening 26 is provided with a generally semi-circular, mid-position, internal side, extended tongue 27 of predetermined size on one long side of each of the openings 26. Each tongue 27 is curved, contoured to provide prominent shoulders on enlarged head 28, and each imposes into each opening 26, with a complementary groove or socket 29 located on a side across the opening 26 in opposed relationship to each tongue 27. Each socket 29 has a narrowed entry 30 which is formed of a shape so as to provide for close fit interlocking with a reduced neck 35 adjacent the head 28 of each complementary tongue 27 therewithin. Each of the series is circumferentially, ninety degrees from two adjacent series. The openings of each of one series is overlapped by openings of each of the two series, and the openings of each series are staggered spaced along the length of the boot 9.

Figure 6:
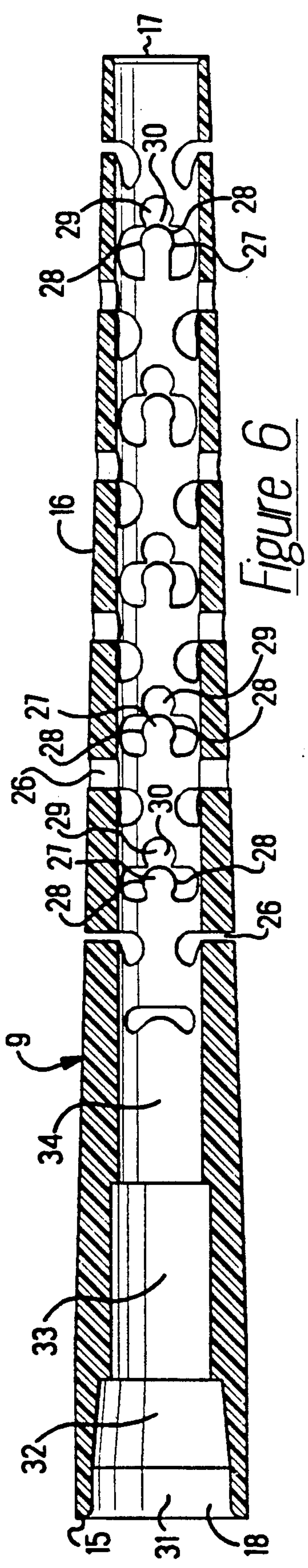
FIG. 6 is a front elevation view, in section, through line 6—6, of the strain relief shown in FIG. 4 and FIG. 5.
Figure 5:
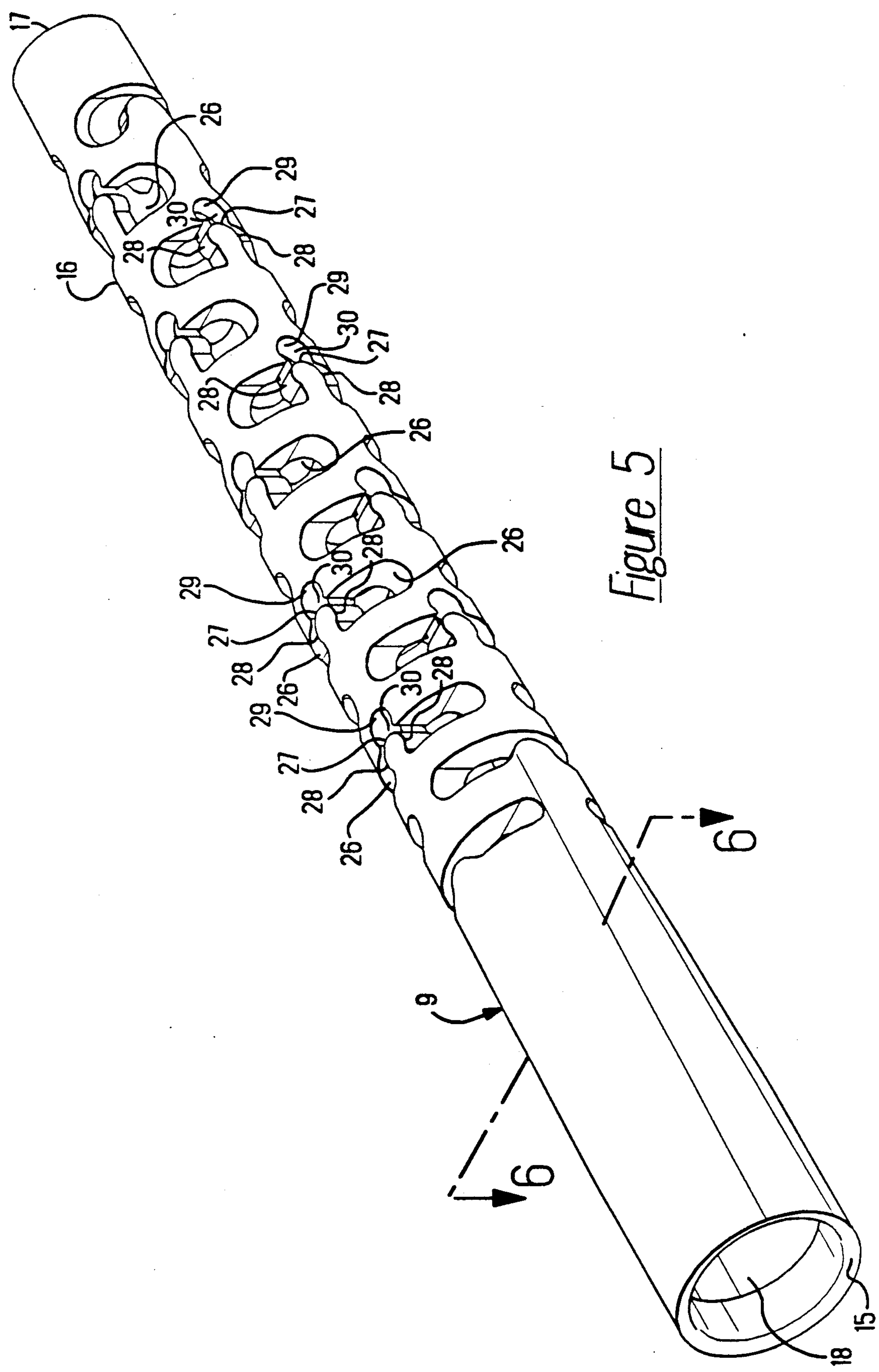
FIG. 5 is a perspective view of the strain relief shown in FIG. 4.

With particular reference to FIG. 6, the strain relief 9 has bore 18 in four sections 31, 32, 33, and 34. Each of sections 31, 32 and 33 is of gradually tapering diameter toward main bore section 34. Sections 33 and 31 are of respective diameters so as to provide complementary friction fit to corresponding rear end 12 and adjacent portion of corresponding alignment ferrule 11. The boot 9 is connected to the connector assembly 7 by inserting the rear end 12 of ferrule 11 into axial bore 18 of boot 9 and displacing the boot 9 along the body 16 of ferrule 11 until rear end 12 is fitted to within sections 31 and 33.

Figure 7:
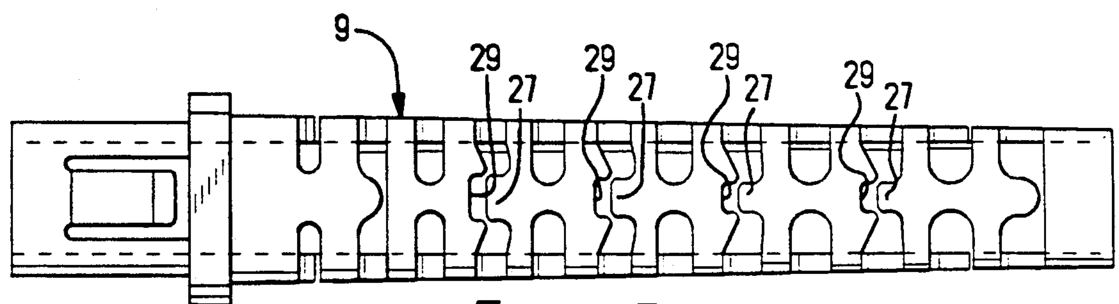
FIG. 7 is an elevation view of another strain relief.
Figure 8:
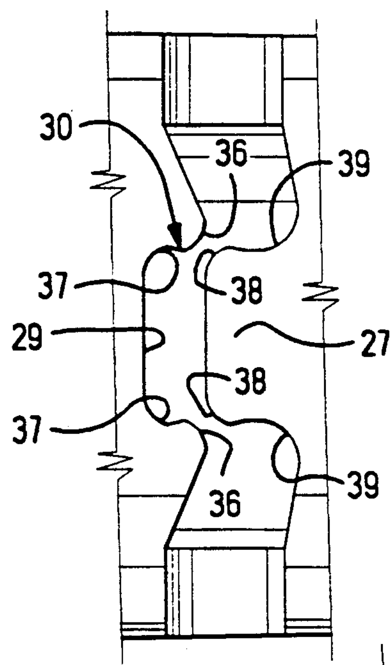
FIGS. 8, 9 and 10 are fragmentary views of portions of the strain relief of FIG. 7.

The boot 9 of the present invention, after assembly to the cable 2 and the connector assembly, may be bent along an arc configuration along any one of the series thereby forcing closure of the corresponding series of openings 26 along the inside of the curvature, along a line passing along urging the corresponding heads 28 of each of tongues 27 into the corresponding entries 30 of complementary grooves 29. Each of the heads 28 snap by the constriction of the corresponding entry 30, and each groove 29 retains each complementary tongue 27 therewithin to lodge the tongue 27 in the groove and maintain the orientation of the relief 9 at a predetermined curvature, to project the cable 2 along the curvature and along a line extending at an angle, preferably at a right angle, to the plane along which extends the connector assembly 7 and the cable 2, without overstressing or kinking of the cable 2. The arc is constrained to a tolerable, or allowable, minimum radius of curvature, because the tongues 27 are lodged in the grooves 29 and prevent further closure of the openings 26 in response to increased bending force applied to the boot 9. With reference to FIG. 7, a strain relief boot 9 of different shaped tongues 27 and grooves or sockets 29 are described as follows. The first tongue 27 and socket 29 in each of the series, as shown in FIG. 7 from left to right, has a geometry shown in FIG. 8, wherein, a narrowed entry 30 is narrower than the remainder of the socket 29 is wide, and the socket 29 is slightly deeper than the length of the socket 29, with outside corners 36 and inside corners 37 being rounded. The tongue 27 is wider at a front end, and has rounded outside corners 38, with each of the corners 38 being tangent to rounded inside corners 39. The inside corners 39 also reduce the width of the tongue 27. The tongue 27 will enter the socket 29 as described previously with reference to FIGS. 1, 2, 4, 5 and 6.

Figure 9:
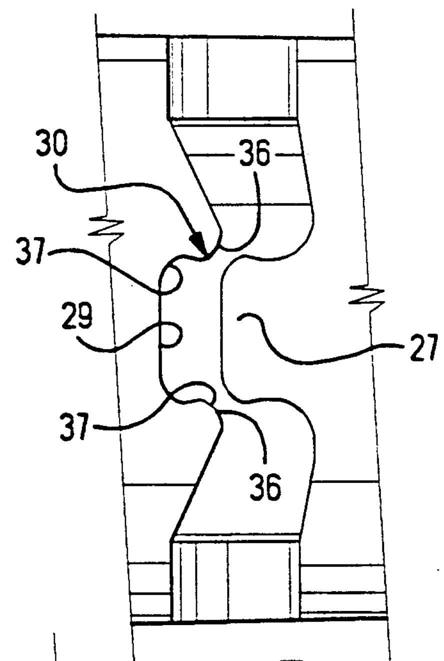

A second tongue 27 and socket 29 in each of the series, as shown in FIG. 7 from left to right, has a geometry shown in FIG. 9, that is smaller than that of the first tongue 27 and socket 29 of the series. The tongues 27 and corresponding sockets 29 decrease in size along the series.

Figure 10:
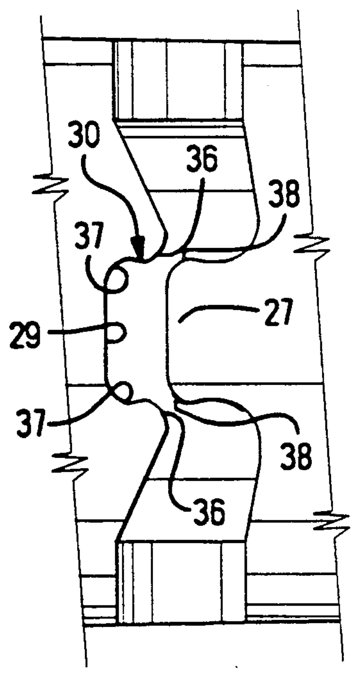

A third and a fourth tongue 27 and corresponding sockets 29 in each of the series, as shown in FIG. 7 from left to right, has a geometry shown in FIG. 10, which is less than the previous tongues 27 and sockets 29 of the series.

Further, it should be recognized that the present invention may include its use with other types of connector assemblies. Accordingly, it should be understood that the invention is to be limited only insofar as required by the scope of the following claims.

We claim:

1. A strain relief for coupling a fiber optic cable with a connector comprising;

a generally tubular length of flexible material provided with a bore receiving said fiber optic cable therewithin, the tubular length being formed with narrow openings extending normally with respect to the axis of said bore, a tongue extending in each of said openings, and a groove located across each of said openings in opposed relationship to a corresponding tongue, said tubular length is curved in an arc, and each tongue is interlocked in a complementary groove to maintain said arc.

2. A strain relief for a cable terminated by a connector, comprising:

an elongated tubular boot of flexible material for encircling a cable, coupling means on the tubular boot for coupling to a connector terminating the cable, at least one series of tongues and a corresponding series of grooves distributed along the elongated tubular boot, each said tongue being released from a respective groove when the tubular boot is substantially uncurved, and when the tubular boot is curved in an arc, each said tongue being interlocked with a respective groove to maintain the tubular boot in an arc, whereby when a cable is encircled by the tubular boot the cable is also maintained in an arc.

3. A strain relief as recited in claim 2 wherein, each tongue is separated from a respective groove by a respective opening in the tubular boot when the tubular boot is substantially uncurved.

4. A strain relief as recited in claim 3 wherein, the outer diameter of the tubular boot is tapered toward an end of the tubular boot.

5. A strain relief as recited in claim 2 wherein, the outer diameter of the tubular boot is tapered toward an end of the tubular boot.

6. A strain relief as recited in claim 5, and further including; multiple series of tongues and corresponding multiple series of grooves distributed along the elongated tubular boot, and multiple series of openings in the tubular boot are between the tongues and grooves when the tongues are released from the grooves, one of the series of openings being overlapped by openings in another of the series of openings, and the openings in said one and said another of the series being staggered.

7. A strain relief as recited in claim 2, and further including; multiple series of tongues and corresponding multiple series of grooves distributed along the elongated tubular boot, and multiple series of openings in the tubular boot are between the tongues and grooves when the tongues are released from the grooves, one of the series of openings being overlapped by openings in another of the series of openings, and the openings in said one and said another of the series being staggered.

8. A strain relief as recited in claim 3, and further including; multiple series of tongues and corresponding multiple series of grooves distributed along the elongated tubular boot, and multiple series of openings in the tubular boot are between the tongues and grooves when the tongues are released from the grooves, one of the series of openings being overlapped by openings in another of the series of openings, and the openings in said one and said another of the series being staggered.

9. A strain relief as recited in claim 4, and further including; multiple series of tongues and corresponding multiple series of grooves distributed along the elongated tubular boot, and multiple series of openings in the tubular boot are between the tongues and grooves when the tongues are released from the grooves, one of the series of openings being overlapped by openings in another of the series of openings, and the openings in said one and said another of the series being staggered.

10. A strain relief as recited in claim 2 wherein, the tongues have contoured heads and necks, and the grooves have shapes so as to interlock with respective tongues.

11. A strain relief as recited in claim 2 wherein, the outer diameter of the tubular boot is tapered toward an end of the tubular boot, and openings through the thickness are between the tongues and the grooves when the tongues are released from the grooves.

12. A strain relief as recited in claim 2 wherein, the cable is a fiber optic cable, and the tubular boot encircles the fiber optic cable.

13. A strain relief as recited in claim 2, and further including multiple series of tongues and corresponding multiple series of grooves distributed along the elongated tubular boot, each said tongue being released from a respective groove when the tubular boot is substantially uncurved, and when the tubular boot is curved in an arc, each said tongue of one of said series being interlocked with a respective groove to maintain the tubular boot in an arc, whereby a cable encircled by the tubular boot is also maintained in an arc.

* * * * *